United States Patent
Li

(10) Patent No.: US 10,268,862 B2
(45) Date of Patent: Apr. 23, 2019

(54) FINGERPRINT COLLECTION METHOD, FINGERPRINT COLLECTOR, AND TERMINAL

(71) Applicant: Huawei Technologies Co., Ltd., Shenzhen (CN)

(72) Inventor: Danhong Li, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/520,042

(22) PCT Filed: Apr. 16, 2015

(86) PCT No.: PCT/CN2015/076755
§ 371 (c)(1),
(2) Date: Apr. 18, 2017

(87) PCT Pub. No.: WO2016/165107
PCT Pub. Date: Oct. 20, 2016

(65) Prior Publication Data
US 2017/0330018 A1 Nov. 16, 2017

(51) Int. Cl.
*G06K 9/00* (2006.01)
*G06K 9/38* (2006.01)
(Continued)

(52) U.S. Cl.
CPC ... *G06K 9/00013* (2013.01); *G06F 17/30256* (2013.01); *G06K 9/00067* (2013.01); *G06K 9/036* (2013.01)

(58) Field of Classification Search
CPC ............ G06K 9/00013; G06K 9/00067; G06F 17/30256
(Continued)

(56) References Cited

U.S. PATENT DOCUMENTS 5,883,971 A 3/1999 Bolle et al.
5,995,640 A 11/1999 Bolle et al.
(Continued)

FOREIGN PATENT DOCUMENTS

CN 1564187 A 1/2005
CN 1804864 A 7/2006
(Continued)

OTHER PUBLICATIONS

Baltes et al.,"CMOS-MEMS Advanced Micro and Nanosystems," CMOS-MEMS Advanced Micro and Nanosystems Chapter 8.3 Capactitive Cmos Fingerprint Sensors: from the Sensor Signal to the Image Raw Data, vol. 2, pp. 407, XP055411026, pp. 407, XP055411026, Wiley-VCH, Weinheim, Germany (2005).
(Continued)

*Primary Examiner* — Sheela C Chawan
(74) *Attorney, Agent, or Firm* — Leydig, Voit & Mayer, Ltd.

(57) ABSTRACT

A fingerprint collection method includes: acquiring, by a fingerprint collector, a fingerprint image of a user; if an average value of the fingerprint image is not in a preset average value range, automatically adjusting a gain of the fingerprint collector, to make an average value of a reacquired fingerprint image approximate the preset average value range; if the average value of the fingerprint image is in the preset average value range, but a variance of the fingerprint image is less than a preset variance threshold, automatically increasing sensitivity of the fingerprint collector, to make a variance of the fingerprint collector accordingly increase; and outputting only a fingerprint image whose average value is in the preset average value range and whose variance is greater than the preset variance threshold.

15 Claims, 7 Drawing Sheets

(51) Int. Cl.
*G06K 9/03* (2006.01)
*G06F 17/30* (2006.01)

(58) Field of Classification Search
USPC ....... 382/100, 115, 116, 124, 125, 253, 254, 382/270, 272, 232, 237, 181, 224, 155, 382/156, 160; 340/5.81, 5.82, 5.83, 5.52, 340/5.51, 5.53; 713/150, 168, 176, 182, 713/185, 186, 187; 250/200, 206, 555, 250/556; 726/26, 31, 32; 356/71
See application file for complete search history.

(56) References Cited

U.S. PATENT DOCUMENTS

| | | | |
|---|---|---|---|
| 6,330,345 B1 | 12/2001 | Russo et al. | |
| 6,483,932 B1* | 11/2002 | Martinez | G06K 9/00026 283/68 |
| 7,110,581 B2* | 9/2006 | Xia | G06K 9/00067 382/124 |
| 8,295,560 B2* | 10/2012 | Abiko | G06K 9/00026 382/115 |
| 8,433,110 B2* | 4/2013 | Kropp | A61B 5/02444 382/124 |
| 8,799,167 B2* | 8/2014 | Carper | G06Q 20/1085 382/124 |
| 2006/0147096 A1* | 7/2006 | Lee | 382/124 |
| 2007/0086631 A1 | 4/2007 | Lu et al. | |
| 2009/0087044 A1 | 4/2009 | Mizushima et al. | |
| 2010/0266169 A1* | 10/2010 | Abiko | G06K 9/00026 382/124 |
| 2014/0267659 A1 | 9/2014 | Lyon et al. | |

FOREIGN PATENT DOCUMENTS

| | | |
|---|---|---|
| CN | 101303728 A | 11/2008 |
| CN | 101773394 A | 7/2010 |
| CN | 103065134 A | 4/2013 |
| CN | 103778420 A | 5/2014 |
| EP | 0797170 A1 | 9/1997 |

OTHER PUBLICATIONS

Ratha et al.,"Automatic Fingerprint Recognition Systems," Automatic Fingerprint Recognition Systems Chapter 2 Advances in Fingerprint Sensors Using RF Imaging Techniques, XP055411032, pp. 47, Springer, New York, USA (2004).

Fisher et al."Dictionary of Computer Vision and Image Processing, 2nd Edition," Dictionary of Computer Vision and Image Processing, 2nd Edition, XP055411036, pp. 253, Wiley (Jan. 2014).

* cited by examiner

FINGERPRINT COLLECTION METHOD, FINGERPRINT COLLECTOR, AND TERMINAL

CROSS-REFERENCE TO RELATED APPLICATIONS

This application is a national stage of International Application No. PCT/CN2015/076755, filed on Apr. 16, 2015, which is hereby incorporated by reference in its entirety.

TECHNICAL FIELD

The present invention relates to the field of image processing, and in particular, to a fingerprint collection method, a fingerprint collector, and a terminal.

BACKGROUND

A fingerprint collector is a precision electronic instrument that performs identification by using different characteristics of fingerprints of people, and is mainly used to collect fingerprints of people for identity verification. However, fingerprints of dry and wet fingers have always been a greatest problem affecting a verification success rate of the fingerprint collector. For example, in dry winter or humid summer, because a finger is excessively dry or excessively wet, it is hard to acquire a desirable fingerprint image by the fingerprint collector.

Currently, the fingerprint collector generally captures fingerprints by using several groups of manually adjusted parameters, such as three sets of parameters: dryness, normal, and wetness parameters, and then selects an optimal fingerprint by means of an algorithm.

However, capturing fingerprints by using several groups of specified parameters cannot adapt to a degree of dryness or wetness of fingers of all users or of a same user at any moment, and verification failure still easily occurs due to poor quality of a captured image.

SUMMARY

Embodiments of the present invention provide a fingerprint collection method, a fingerprint collector, and a terminal, to improve quality of an image collected by the fingerprint collector, thereby increasing a verification success rate of a fingerprint sensor.

A first aspect of the embodiments of the present invention provides a fingerprint collection method, including:

acquiring, by a fingerprint collector, a fingerprint image of a user;

determining, by the fingerprint collector, whether an average value of the fingerprint image is in a preset average value range, where the average value of the fingerprint image is an average value of pixel values of pixels in the fingerprint image;

when determining that the average value of the fingerprint image is not in the preset average value range, adjusting, by the fingerprint collector, a gain of the fingerprint collector according to the average value of the fingerprint image, to make an average value of a fingerprint image reacquired by the fingerprint collector approximate the preset average value range;

when determining that the average value of the fingerprint image is in the preset average value range, determining, by the fingerprint collector, whether a variance of the fingerprint image is greater than a preset variance threshold, where the variance of the fingerprint image is a variance of the pixel values of the pixels in the fingerprint image;

when determining that the variance of the fingerprint image is less than the preset variance threshold, increasing, by the fingerprint collector, sensitivity of the fingerprint collector according to the variance of the fingerprint image, to make a variance of a fingerprint image reacquired by the fingerprint collector increase; and when determining that the average value of the fingerprint image is in the preset average value range and the variance of the fingerprint image is greater than the preset variance threshold, outputting, by the fingerprint collector, the fingerprint image.

With reference to the first aspect of the embodiments of the present invention, in a first implementation manner of the first aspect of the embodiments of the present invention, before the step of determining, by the fingerprint collector, whether an average value of the fingerprint image is in a preset average value range, the method further includes:

determining, by the fingerprint collector, whether a difference between the average value of the fingerprint image and an average value of a fingerprint image acquired at a previous time is less than a preset difference value;

when determining that the difference is less than the preset difference value, triggering the step of determining, by the fingerprint collector, whether an average value of the fingerprint image is in a preset average value range; and when determining that the difference is greater than the preset difference value, triggering the step of acquiring, by a fingerprint collector, a fingerprint image of a user.

With reference to the first implementation manner of the first aspect of the embodiments of the present invention, in a second implementation manner of the first aspect of the embodiments of the present invention, before the step of determining, by the fingerprint collector, whether a difference between the average value of the fingerprint image and an average value of a fingerprint image acquired at a previous time is less than a preset difference value, the method further includes:

determining, by the fingerprint collector, whether the average value of the fingerprint image is greater than a preset detection threshold;

when determining that the average value is greater than the preset detection threshold, triggering the step of determining, by the fingerprint collector, whether a difference between the average value of the fingerprint image and an average value of a fingerprint image acquired at a previous time is less than a preset difference value; and when determining that the average value is less than the preset detection threshold, triggering the step of acquiring, by a fingerprint collector, a fingerprint image of a user.

With reference to any implementation manner of the first aspect of the embodiments of the present invention to the second implementation manner of the first aspect, in a third implementation manner of the first aspect of the embodiments of the present invention, the adjusting, by the fingerprint collector, a gain of the fingerprint collector according to the average value of the fingerprint image specifically includes:

when the average value of the fingerprint image is less than a minimum value of the preset average value range, increasing the gain of the fingerprint collector by 1, where a value of a center point of the preset average value range is 127 or 128; and when the average value of the fingerprint image is greater than a maximum value of the preset average value range, decreasing the gain of the fingerprint collector by 1; and the increasing, by the fingerprint collector, sensitivity of the fingerprint collector according to the variance of the fingerprint image specifically includes:

increasing the sensitivity of the fingerprint collector by 1.

With reference to any implementation manner of the first aspect of the embodiments of the present invention to the second implementation manner of the first aspect, in a fourth implementation manner of the first aspect of the embodiments of the present invention, the method further includes:

storing, by the fingerprint sensor, a first correspondence and a second correspondence, where the first correspondence represents a correspondence between preset average values and preset gain adjustment values, and the second correspondence represents a correspondence between preset variances and preset sensitivity adjustment values;

the adjusting, by the fingerprint collector, a gain of the fingerprint collector according to the average value of the fingerprint image specifically includes:

searching, by the fingerprint collector, the first correspondence for a gain adjustment value corresponding to the average value of the fingerprint image; and adjusting, by the fingerprint collector, the gain of the fingerprint collector according to the found gain adjustment value, to make the average value of the fingerprint image reacquired by the fingerprint collector fall in the preset average value range; and the increasing, by the fingerprint collector, sensitivity of the fingerprint collector according to the variance of the fingerprint image specifically includes:

searching, by the fingerprint collector, the second correspondence for a sensitivity adjustment value corresponding to the variance of the fingerprint image; and increasing, by the fingerprint collector, the sensitivity of the fingerprint collector according to the found sensitivity adjustment value, to make the variance of the fingerprint image reacquired by the fingerprint collector greater than the preset variance threshold.

A second aspect of the embodiments of the present invention provides a fingerprint collector, including:

an acquiring module, configured to acquire a fingerprint image of a user;

a first determining module, configured to determine whether an average value of the fingerprint image acquired by the acquiring module is in a preset average value range, where the average value of the fingerprint image is an average value of pixel values of pixels in the fingerprint image;

a gain adjustment module, configured to: when the first determining module determines that the average value of the fingerprint image is not in the preset average value range, adjust a gain of the fingerprint collector according to the average value of the fingerprint image, to make an average value of a fingerprint image reacquired by the acquiring module approximate the preset average value range;

a second determining module, configured to: when the first determining module determines that the average value of the fingerprint image is in the preset average value range, determine whether a variance of the fingerprint image is greater than a preset variance threshold, where the variance of the fingerprint image is a variance of the pixel values of the pixels in the fingerprint image;

a sensitivity increasing module, configured to: when the second determining module determines that the variance of the fingerprint image is less than the preset variance threshold, increase sensitivity of the fingerprint collector according to the variance of the fingerprint image, to make a variance of a fingerprint image reacquired by the acquiring module increase; and an output module, configured to: when the first determining module determines that the average value of the fingerprint image is in the preset average value range and the second determining module determines that the variance of the fingerprint image is greater than the preset variance threshold, output the fingerprint image acquired by the acquiring module.

With reference to the second aspect of the embodiments of the present invention, in a first implementation manner of the second aspect of the embodiments of the present invention, the fingerprint collector further includes:

a third determining module, configured to determine whether a difference between the average value of the fingerprint image acquired by the acquiring module and an average value of a fingerprint image acquired at a previous time is less than a preset difference value;

a first triggering module, configured to: when the third determining module determines that the difference is less than the preset difference value, trigger the first determining module; and a second triggering module, configured to: when the third determining module determines that the difference is greater than the preset difference value, trigger the acquiring module.

With reference to the first implementation manner of the second aspect of the embodiments of the present invention, in a second implementation manner of the second aspect of the embodiments of the present invention, the fingerprint collector further includes:

a fourth determining module, configured to determine whether the average value of the fingerprint image acquired by the acquiring module is greater than a preset detection threshold;

a third triggering module, configured to: when the fourth determining module determines that the average value is greater than the preset detection threshold, trigger the third determining module; and a fourth triggering module, configured to: when the fourth determining module determines that the average value is less than the preset detection threshold, trigger the acquiring module.

With reference to any implementation manner of the second aspect of the embodiments of the present invention to the second implementation manner of the second aspect, in a third implementation manner of the second aspect of the embodiments of the present invention, the gain adjustment module specifically includes:

a gain increasing unit, configured to: when the first determining module determines that the average value of the fingerprint image is less than a minimum value of the preset average value range, increase the gain of the fingerprint collector by 1, where a value of a center point of the preset average value range is 127 or 128; and a gain decreasing unit, configured to: when the average value of the fingerprint image is greater than a maximum value of the preset average value range, decrease the gain of the fingerprint collector by 1; and the sensitivity increasing module is specifically configured to: when the second determining module determines that the variance of the fingerprint image is less than the preset variance threshold, increase the sensitivity of the fingerprint collector by 1.

With reference to any implementation manner of the second aspect of the embodiments of the present invention to the second implementation manner of the second aspect, in a fourth implementation manner of the second aspect of the embodiments of the present invention, the fingerprint collector further includes:

a storage module, configured to store a first correspondence and a second correspondence, where the first correspondence represents a correspondence between preset average values and preset gain adjustment values, and the second correspondence represents a correspondence between preset variances and preset sensitivity adjustment values;

the gain adjustment module specifically includes:

a gain search unit, configured to search the first correspondence stored by the storage module for a gain adjustment value corresponding to the average value of the fingerprint image; and a gain adjustment unit, configured to adjust the gain of the fingerprint collector according to the gain adjustment value found by the gain search unit, to make the average value of the fingerprint image reacquired by the acquiring module fall in the preset average value range; and the sensitivity increasing module specifically includes:

a sensitivity search unit, configured to search the second correspondence stored by the storage module for a sensitivity adjustment value corresponding to the variance of the fingerprint image; and a sensitivity increasing unit, configured to increase the sensitivity of the fingerprint collector according to the sensitivity adjustment value found by the sensitivity search unit, to make the variance of the fingerprint image reacquired by the acquiring module greater than the preset variance threshold.

A third aspect of the embodiments of the present invention provides a terminal, including:

a fingerprint sensor, an output apparatus, a memory, and a processor, where the fingerprint sensor is configured to acquire a fingerprint image of a user; and the processor is configured to perform the following steps by invoking an operation instruction stored in the memory:

determining whether an average value of the fingerprint image acquired by the fingerprint sensor is in a preset average value range, where the average value of the fingerprint image is an average value of pixel values of pixels in the fingerprint image;

when determining that the average value of the fingerprint image is not in the preset average value range, adjusting a gain of the fingerprint sensor according to the average value of the fingerprint image, to make an average value of a fingerprint image reacquired by the fingerprint sensor approximate the preset average value range;

when determining that the average value of the fingerprint image is in the preset average value range, determining whether a variance of the fingerprint image is greater than a preset variance threshold, where the variance of the fingerprint image is a variance of the pixel values of the pixels in the fingerprint image;

when determining that the variance of the fingerprint image is less than the preset variance threshold, increasing sensitivity of the fingerprint sensor according to the variance of the fingerprint image, to make a variance of a fingerprint image reacquired by the fingerprint sensor increase; and when determining that the average value of the fingerprint image is in the preset average value range and the variance of the fingerprint image is greater than the preset variance threshold, instructing the output apparatus to output the fingerprint image.

With reference to the third aspect of the embodiments of the present invention, in a first implementation manner of the third aspect of the embodiments of the present invention, before performing the step of determining whether an average value of the fingerprint image acquired by the fingerprint sensor is in a preset average value range, the processor is further configured to perform the following steps:

determining whether a difference between the average value of the fingerprint image and an average value of a fingerprint image acquired at a previous time is less than a preset difference value;

when determining that the difference is less than the preset difference value, performing the step of determining whether an average value of the fingerprint image acquired by the fingerprint sensor is in a preset average value range; and when determining that the difference is greater than the preset difference value, instructing the fingerprint sensor to reacquire a fingerprint image of the user.

With reference to the first implementation manner of the third aspect of the embodiments of the present invention, in a second implementation manner of the third aspect of the embodiments of the present invention, before performing the step of determining whether a difference between the average value of the fingerprint image and an average value of a fingerprint image acquired at a previous time is less than a preset difference value, the processor is further configured to perform the following steps:

determining whether the average value of the fingerprint image is greater than a preset detection threshold;

when determining that the average value is greater than the preset detection threshold, performing the step of determining whether a difference between the average value of the fingerprint image and an average value of a fingerprint image acquired at a previous time is less than a preset difference value; and when determining that the average value is less than the preset detection threshold, instructing the fingerprint sensor to reacquire a fingerprint image of the user.

With reference to any implementation manner of the third aspect of the embodiments of the present invention to the second implementation manner of the third aspect, in a third implementation manner of the third aspect of the embodiments of the present invention, when performing the step of adjusting a gain of the fingerprint sensor according to the average value of the fingerprint image, the processor specifically performs the following steps:

when the average value of the fingerprint image is less than a minimum value of the preset average value range, increasing the gain of the fingerprint sensor by 1, where a value of a center point of the preset average value range is 127 or 128; and when the average value of the fingerprint image is greater than a maximum value of the preset average value range, decreasing the gain of the fingerprint sensor by 1; and when performing the step of increasing sensitivity of the fingerprint sensor according to the variance of the fingerprint image, the processor specifically performs the following step:

increasing the sensitivity of the fingerprint sensor by 1.

With reference to any implementation manner of the third aspect of the embodiments of the present invention to the second implementation manner of the third aspect, in a fourth implementation manner of the third aspect of the embodiments of the present invention, the memory is further configured to store a first correspondence and a second correspondence, where the first correspondence represents a correspondence between preset average values and preset gain adjustment values, and the second correspondence represents a correspondence between preset variances and preset sensitivity adjustment values;

when performing the step of adjusting a gain of the fingerprint sensor according to the average value of the fingerprint image, the processor specifically performs the following steps:

searching the first correspondence for a gain adjustment value corresponding to the average value of the fingerprint image; and adjusting the gain of the fingerprint sensor according to the found gain adjustment value, to make the average value of the fingerprint image reacquired by the fingerprint sensor fall in the preset average value range; and when performing the step of increasing sensitivity of the fingerprint sensor according to the variance of the fingerprint image, the processor specifically performs the following steps:

searching the second correspondence for a sensitivity adjustment value corresponding to the variance of the fingerprint image; and increasing the sensitivity of the fingerprint sensor according to the found sensitivity adjustment value, to make the variance of the fingerprint image reacquired by the fingerprint sensor greater than the preset variance threshold.

A fourth aspect of the embodiments of the present invention provides a computer readable storage medium that stores one or more programs, where the one or more programs include instructions, and when the instructions are executed by a portable electronic device including multiple application programs, the portable electronic device executes the implementation manner according to any one of the first aspect to the fourth implementation manner of the first aspect.

It may be seen from the foregoing technical solutions that, the embodiments of the present invention have the following advantages: In the embodiments of the present invention, after a fingerprint collector acquires a fingerprint image of a user, if an average value of the fingerprint image is not in a preset average value range, a gain of the fingerprint collector is automatically adjusted, to make an average value of a reacquired fingerprint image approximate the preset average value range. If the average value of the fingerprint image is in the preset average value range, but a variance of the fingerprint image is less than a preset variance threshold, sensitivity of the fingerprint collector automatically increases, to make a variance of the fingerprint collector accordingly increase. Only a fingerprint image whose average value is in the preset average value range and whose variance is greater than the preset variance threshold is output. In this way, by means of adaptive parameter adjustment, it is ensured that an average value and a variance of a collected fingerprint image each fall within a required quality range, so that the fingerprint sensor can adapt to a degree of dryness or wetness of fingers of all users or of a same user at any moment. Therefore, quality of an image collected by the fingerprint collector is improved, and a verification success rate of the fingerprint sensor is increased.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Figure 1:
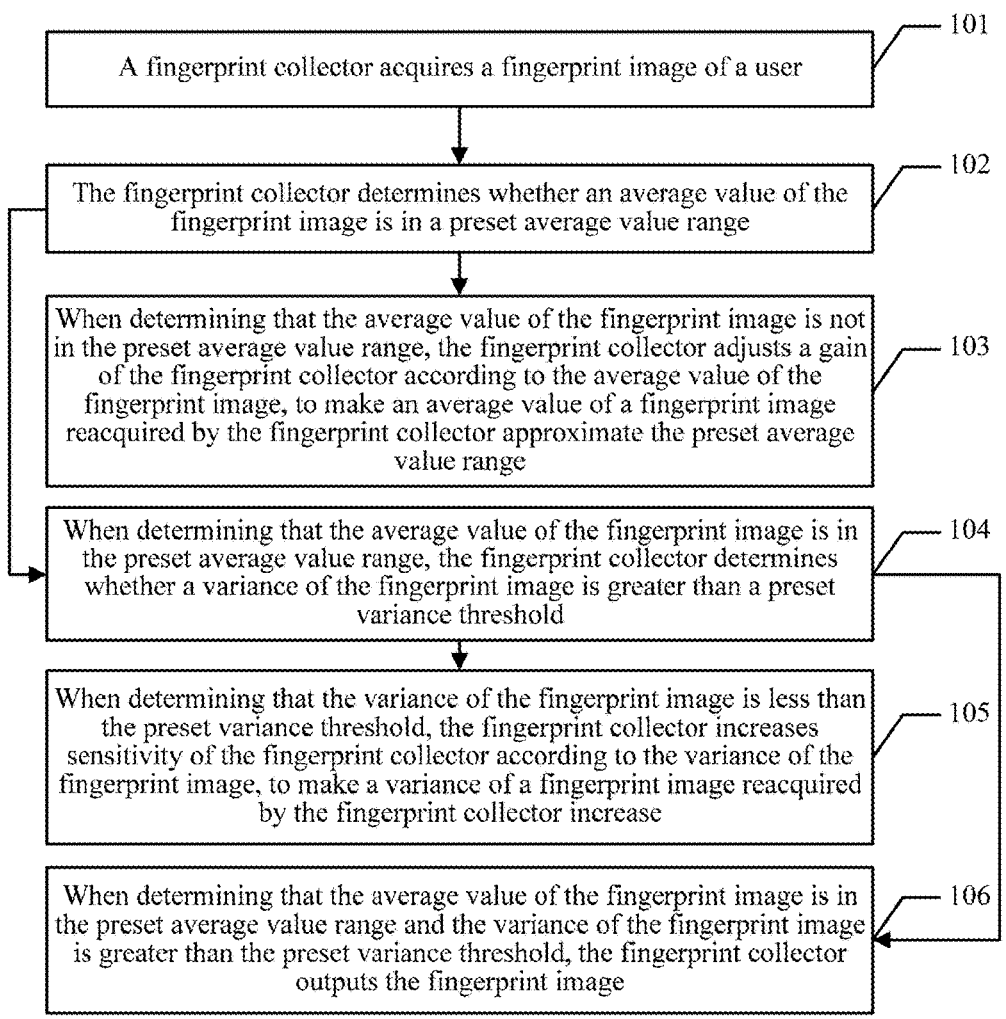
FIG. 1 is a schematic flowchart of a fingerprint collection method according to an embodiment of the present invention.

Referring to FIG. 1, an embodiment of a fingerprint collection method according to an embodiment of the present invention includes the following steps.

101: A fingerprint collector acquires a fingerprint image of a user.

When sensing that a finger of the user is pressing on the fingerprint collector, the fingerprint collector acquires the fingerprint image of the user.

102: The fingerprint collector determines whether an average value of the fingerprint image is in a preset average value range.

After acquiring the fingerprint image of the user, the fingerprint collector determines whether the average value of the acquired fingerprint image is in the preset average value range, where the average value of the fingerprint image is an average value of pixel values of pixels in the fingerprint image.

It should be noted that, an average value of a fingerprint image mainly affects an overall black or white degree of the fingerprint image. If the average value of the fingerprint image is excessively large, the entire fingerprint image is excessively white, or if the average value of the fingerprint image is excessively small, the entire fingerprint image is excessively black. Therefore, if it needs to ensure that a collected fingerprint image is recognizable, first, it needs to ensure that an average value of the fingerprint image is in the preset average value range. In this way, the collected fingerprint image is not excessively black or excessively white and is easier to recognize. A pixel value has a value range of 0 to 255. Therefore, generally, a value of a center point of the preset average value range may be 127 or 128. Certainly, in actual applications, the preset average value range may have more other center points according to performance of fingerprint collectors and user requirements, and values of the range may also be determined in multiple manners, for example, a positive or negative deviation of 20 from the center point, or a positive or negative deviation of 35 from the center point. This is not limited herein.

103: When determining that the average value of the fingerprint image is not in the preset average value range, the fingerprint collector adjusts a gain of the fingerprint collector according to the average value of the fingerprint image, to make an average value of a fingerprint image reacquired by the fingerprint collector approximate the preset average value range.

In this step, adjustment of the gain of the fingerprint collector can affect the average value of the fingerprint image that is further collected by the fingerprint collector. Specifically, an increase in the gain of the fingerprint collector may increase the average value of the fingerprint image that is further collected, and a decrease in the gain of the fingerprint collector may decrease the average value of the fingerprint image that is further collected. Therefore, when determining that the average value of the fingerprint image is not in the preset average value range, the fingerprint collector may adjust the gain of the fingerprint collector according to a comparison between the average value of the currently acquired fingerprint image and the preset average value range, to make the average value of the fingerprint image reacquired by the fingerprint collector approximate the preset average value range, and finally adjust an average value of an acquired fingerprint image to be in the preset average value range. To make the average value of the fingerprint image reacquired by the fingerprint collector approximate the preset average value range means, in terms of a quantitative relationship, is to decrease an absolute value of a difference value between the average value of the reacquired fingerprint image and the center point of the preset average value range.

104: When determining that the average value of the fingerprint image is in the preset average value range, the fingerprint collector determines whether a variance of the fingerprint image is greater than a preset variance threshold.

In this step, if the average value of the fingerprint image is in the preset average value range, the fingerprint collector determines whether the variance of the fingerprint image is greater than the preset variance threshold, where the variance of the fingerprint image is a variance of the pixel values of the pixels in the fingerprint image.

It should be noted that, a value of the variance of the fingerprint image mainly affects contrast (that is, a distinction between black and white) of the fingerprint image. If the variance of the fingerprint image is excessively small, the fingerprint image has relatively low contrast, and is hard to recognize. Therefore, if it needs to ensure that a collected fingerprint image is recognizable, in addition to ensuring that an average value of the fingerprint image is in the preset average value range, it further needs to ensure that a variance of the fingerprint image is greater than the preset variance threshold. In this way, a collected image has sharp black-white contrast, facilitating reorganization and fingerprint verification.

105: When determining that the variance of the fingerprint image is less than the preset variance threshold, the fingerprint collector increases sensitivity of the fingerprint collector according to the variance of the fingerprint image, to make a variance of a fingerprint image reacquired by the fingerprint collector increase.

In this step, an increase in the sensitivity of the fingerprint collector stretches a signal for fingerprint image collection, and can increase the variance of the fingerprint image that is further collected by the fingerprint collector. Therefore, when determining that the variance of the fingerprint image is less than the preset variance threshold, the fingerprint collector increases the sensitivity of the fingerprint collector, to increase the variance of the fingerprint image reacquired by the fingerprint collector, and finally make the variance of the reacquired fingerprint image greater than the preset variance threshold.

106: When determining that the average value of the fingerprint image is in the preset average value range and the variance of the fingerprint image is greater than the preset variance threshold, the fingerprint collector outputs the fingerprint image.

In this step, the fingerprint collector outputs the fingerprint image for fingerprint verification only when the average value of the acquired fingerprint image is in the preset average value range and the variance of the fingerprint image is greater than the preset variance threshold.

It may be understood that, when the variance of the fingerprint image is equal to the preset variance threshold, processing is related to a value of the preset variance threshold. In an actual application, according to a different value of the preset variance threshold, it may be set that step 105 is performed when the variance of the fingerprint image is equal to the preset variance threshold, or it may be set that step 106 is performed when the variance of the fingerprint image is equal to the preset variance threshold. This is not limited herein.

It should be noted that, in this embodiment of the present invention, when it is determined that the average value of the fingerprint image is not in the preset average value range, step 103 needs to be performed to adjust the gain of the fingerprint collector, and then step 101 is performed again to acquire a fingerprint image. When it is determined that the variance of the fingerprint image is less than the preset variance threshold, step 105 is performed to increase the sensitivity of the fingerprint collector, and then step 101 is performed again to acquire a fingerprint image. After several times of adaptive gain and/or sensitivity adjustment, when a variance of a reacquired fingerprint image is in the preset average value range and a variance is greater than the preset variance threshold, the fingerprint image satisfying requirements is then output.

In this embodiment of the present invention, after a fingerprint collector acquires a fingerprint image of a user, if an average value of the fingerprint image is not in a preset average value range, a gain of the fingerprint collector is automatically adjusted, to make an average value of a reacquired fingerprint image approximate the preset average value range. If the average value of the fingerprint image is in the preset average value range, but a variance of the fingerprint image is less than a preset variance threshold, sensitivity of the fingerprint collector automatically increases, to make a variance of the fingerprint collector accordingly increase. Only a fingerprint image whose average value is in the preset average value range and whose variance is greater than the preset variance threshold is output. In this way, by means of adaptive parameter adjustment, it is ensured that an average value and a variance of a collected fingerprint image each fall within a required quality range, so that the fingerprint sensor can adapt to a degree of dryness or wetness of fingers of all users or of a same user at any moment. Therefore, quality of an image collected by the fingerprint collector is improved, and a verification success rate of the fingerprint sensor is increased.

Figure 2:
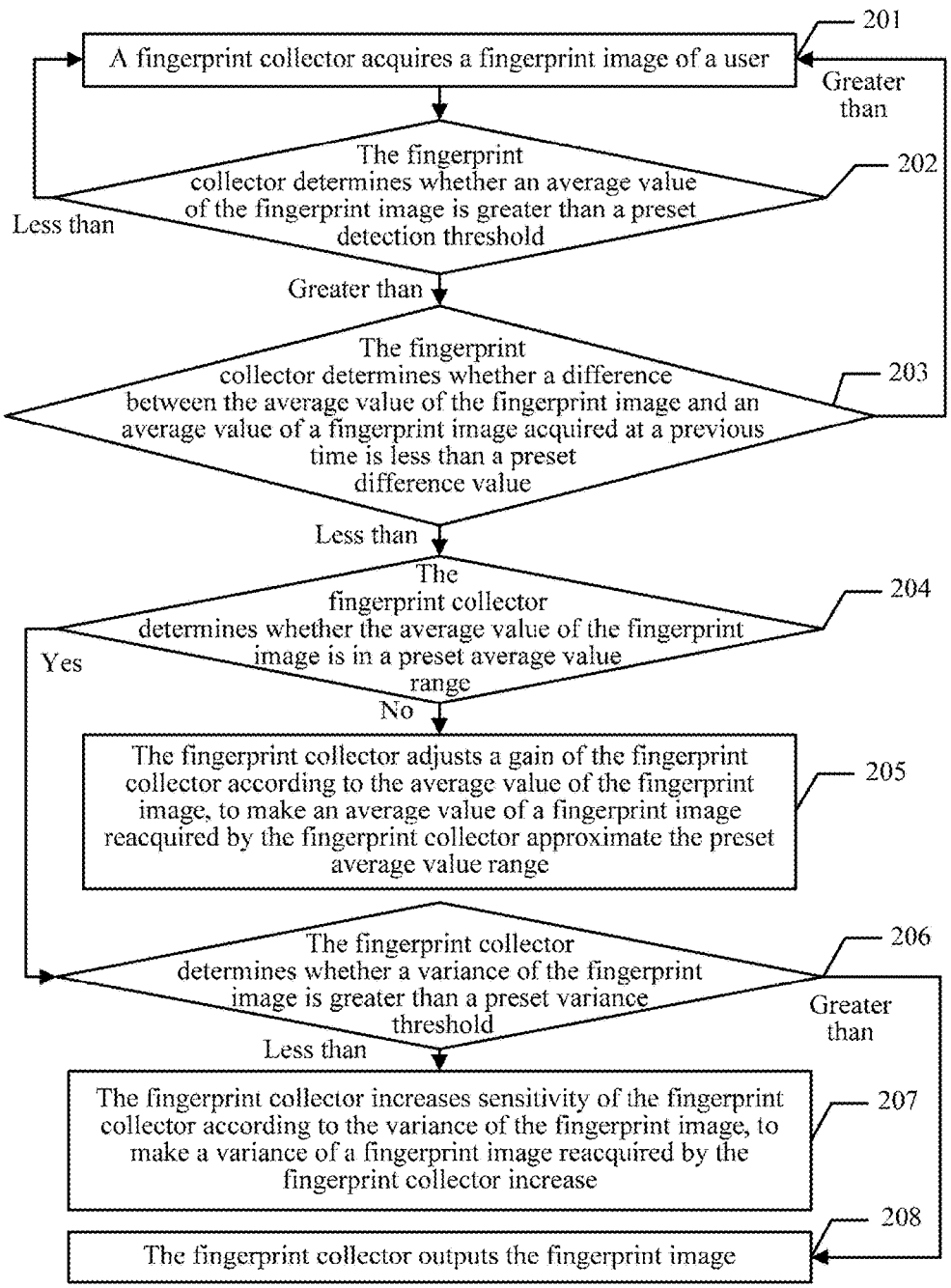
FIG. 2 is another schematic flowchart of a fingerprint collection method according to an embodiment of the present invention.

In the foregoing embodiment, after acquiring the fingerprint image, the fingerprint collector first determines whether the average value of the fingerprint image is in the preset average value range. In an actual application, before determining whether the average value of the fingerprint image is in the preset average value range, the fingerprint collector may further first determine stability and a data volume of the fingerprint image, and perform subsequent operations after determining that requirements are satisfied. The fingerprint collection method in this embodiment of the present invention is described in detail below. Referring to FIG. 2, another embodiment of a fingerprint collection method according to an embodiment of the present invention includes:

201: A fingerprint collector acquires a fingerprint image of a user.

It should be noted that, after the fingerprint collector acquires the fingerprint image of the user, an average value of the acquired fingerprint image and a variance of the fingerprint image may be calculated.

The average value of the fingerprint image is an average value of pixel values of pixels in the fingerprint image, and a calculation formula may be:

$$A_n = \frac{a_1 + a_2 + a_3 + \cdots + a_n}{n},$$

where n is a quantity of the pixels in the fingerprint image, $a_n$ represents a pixel value of the $n^{th}$ pixel in the fingerprint image, and $A_n$ represents an average value of pixel values of the n pixels in the fingerprint image.

The variance of the fingerprint image is a variance of the pixel values of the pixels in the fingerprint image, and a calculation formula may be $$s^2 = \frac{1}{n}[(x_1 - x)^2 + (x_2 - x)^2 + \cdots + (x_n - x)^2],$$

where n is the quantity of the pixels in the fingerprint image, s represents the variance of the fingerprint image, $x_n$ represents the pixel value of the $n^{th}$ pixel in the fingerprint image, and x represents the calculated average value of the fingerprint image.

202: The fingerprint collector determines whether an average value of the fingerprint image is greater than a preset detection threshold.

After acquiring the fingerprint image of the user, the fingerprint collector determines whether the average value of the fingerprint image is greater than the preset detection threshold;

when determining that the average value is greater than the preset detection threshold, triggers step 203; and when determining that the average value is less than the preset detection threshold, triggers step 201.

It may be understood that, when the average value of the fingerprint image is equal to the preset detection threshold, processing is related to a value of the preset detection threshold. In an actual application, it may be set that step 203 is triggered when the average value of the fingerprint image is equal to the preset detection threshold, or it may be set that step 201 is triggered when the average value of the fingerprint image is equal to the preset detection threshold. This is not limited herein.

Figure 3:
FIG. 3 is a schematic diagram of an example in which fingerprint images acquired by a fingerprint collector change with time according to an embodiment of the present invention.

As shown in FIG. 3, FIG. 3 is a schematic diagram of an example in which fingerprint images acquired by a fingerprint collector change with time. It may be known that putting a finger on a fingerprint sensor is a continual process, and the fingerprint sensor can collect many fingerprint images in this process. When a finger of a user is just put on and has not been in full contact with the fingerprint sensor, although the fingerprint sensor can acquire a fingerprint image, the acquired image may not have a sufficient data volume, and cannot be used for fingerprint identification. Therefore, subsequent steps are performed only when it is determined that an average value of a fingerprint image is greater than the preset detection threshold, and if the average value is less than the preset detection threshold, a fingerprint image is reacquired. This can improve operating efficiency of the fingerprint collector.

203: The fingerprint collector determines whether a difference between the average value of the fingerprint image and an average value of a fingerprint image acquired at a previous time is less than a preset difference value.

It should be noted that, as time that a finger is put on the fingerprint sensor increases, images acquired by the fingerprint collector gradually change. First, a fingerprint image acquired before full contact does not have a sufficient data volume. Then, a fingerprint image acquired after full contact is relatively stable and can reflect a finger status of a user. As time goes by, the finger starts to sweat, an image is caused to be excessively black subsequently, and an acquired fingerprint image cannot reflect a real fingerprint status. Therefore, if a qualified fingerprint image needs to be collected, timing for fingerprint image collection is also crucial.

In this step, the timing for fingerprint image collection is determined by determining whether the difference between the average value of the fingerprint image and the average value of the fingerprint image acquired at a previous time is less than the preset difference value during a gradual image change.

When the difference between the average values is less than the preset difference value, it represents that the average value is close to a relatively stable state in this case, and the image collected in this case can best reflect a real fingerprint status. Therefore, step 204 may be triggered.

When the difference between the average values is greater than the preset difference value, it represents that the average value is not stable yet in this case, and the collected image may not reflect a real fingerprint status. Therefore, step 201 may be triggered, to collect a next image and perform determining again.

It may be understood that, when the difference between the average values is equal to the preset difference value, processing is related to a value of the preset difference value. In an actual application, it may be set that step 204 is triggered when the difference between the average values is equal to the preset difference value, or it may be set that step 201 is triggered when the difference between the average values is equal to the preset difference value. This is not limited herein.

It may be understood that, if a current image on which determining is performed is the first fingerprint image collected by the fingerprint collector, and there is no image whose average value can be compared with the average value of the current image, step 201 may be directly triggered, to collect a next image and perform determining again.

204: The fingerprint collector determines whether the average value of the fingerprint image is in a preset average value range.

When the fingerprint collector determines that the difference between the average value of the acquired fingerprint image and the average value of the fingerprint image acquired at a previous time is less than the preset difference value, it represents that the acquired fingerprint image can reflect a relatively real fingerprint status. The fingerprint collector determines whether the average value of the fingerprint image is in the preset average value range.

When it is determined that the average value of the fingerprint image is not in the preset average value range, step 205 is triggered; and when it is determined that the average value of the fingerprint image is in the preset average value range, step 206 is triggered.

Figure 4:
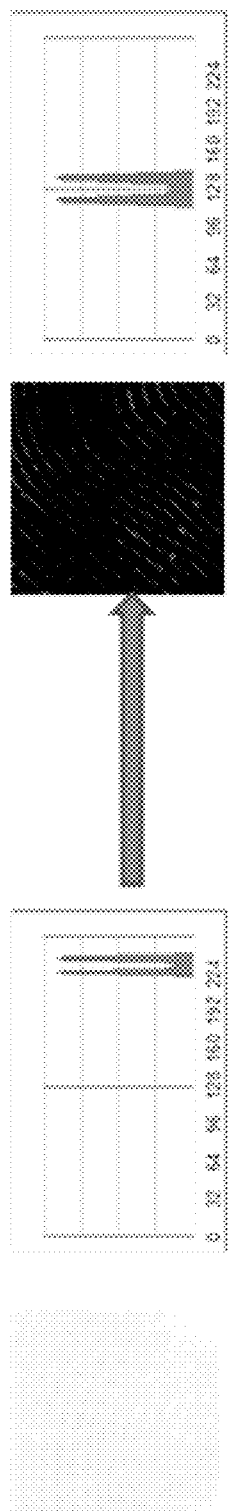
FIG. 4 is a schematic effect diagram that shows impact of an average value on a black or white degree of an image according to an embodiment of the present invention.

It should be noted that, an average value of a fingerprint image mainly affects an overall black or white degree of the fingerprint image. If the average value of the fingerprint image is excessively large, the entire fingerprint image is excessively white, or if the average value of the fingerprint image is excessively small, the entire fingerprint image is excessively black. As shown in FIG. 4, FIG. 4 is a schematic effect diagram that shows an impact of an average value on a black or white degree of an image. It can be seen that, when the average value is 224, the image is excessively white, and a fingerprint thereof is hard to recognize. When the average value is 127 or 128, the image is not excessively black or white, and a fingerprint thereof is recognizable. Therefore, if it needs to ensure that a collected fingerprint image is recognizable, first, it needs to ensure that an average value of the fingerprint image is in the preset average value range. In this way, the collected fingerprint image is not excessively black or excessively white and is easier to recognize. A pixel value has a value range of 0 to 255. Therefore, generally, a value of a center point of the preset average value range may be 127 or 128. Certainly, in actual applications, the preset average value range may have more other center points according to performance of fingerprint collectors and user requirements, and values of the range may also be determined in multiple manners, for example, a positive or negative deviation of 20 from the center point, or a positive or negative deviation of 35 from the center point. This is not limited herein.

205: The fingerprint collector adjusts a gain of the fingerprint collector according to the average value of the fingerprint image, to make an average value of a fingerprint image reacquired by the fingerprint collector approximate the preset average value range.

When determining that the average value of the fingerprint image is not in the preset average value range, the fingerprint collector adjusts the gain of the fingerprint collector according to the average value of the fingerprint image, to make the average value of the fingerprint image reacquired by the fingerprint collector approximate the preset average value range.

It may be understood that, there are multiple manners for adjusting the gain of the fingerprint collector, and two manners are used below as examples.

Optionally, in one manner for adjusting the gain of the fingerprint collector, the fingerprint collector may compare the average value of the fingerprint image with a maximum value and a minimum value of the preset average value range. When the average value of the fingerprint image is less than the minimum value of the preset average value range, the gain of the fingerprint collector is increased by 1; or when the average value of the fingerprint image is greater than the maximum value of the preset average value range, the gain of the fingerprint collector is decreased by 1.

Optionally, in the other manner for adjusting the gain of the fingerprint collector, the fingerprint sensor may store a first correspondence and a second correspondence in advance. The first correspondence represents a correspondence between preset average values and preset gain adjustment values, where the average value increases inversely with the gain adjustment value. The second correspondence represents a correspondence between preset variances and preset sensitivity adjustment values, where the variance increases inversely with the sensitivity adjustment value. It may be understood that, the correspondences may be correspondences between direct numerical values, or may be functional relationships. This is not limited herein. When adjusting the gain, the fingerprint collector may first search the first correspondence for a gain adjustment value corresponding to the average value of the fingerprint image, and adjust the gain of the fingerprint collector according to the found gain adjustment value, to make the average value of the fingerprint image reacquired by the fingerprint collector fall in the preset average value range.

206: The fingerprint collector determines whether a variance of the fingerprint image is greater than a preset variance threshold.

When determining that the average value of the acquired fingerprint image is in the preset average value range, the fingerprint collector determines whether the variance of the fingerprint image is greater than the preset variance threshold;

if determining that the variance of the fingerprint image is less than the preset variance threshold, triggers step 207; and if determining that the variance of the fingerprint image is greater than the preset variance threshold, triggers step 208.

It may be understood that, when the variance of the fingerprint image is equal to the preset variance threshold, processing is related to a value of the preset variance threshold. In an actual application, according to a different value of the preset variance threshold, it may be set that step 207 is performed when the variance of the fingerprint image is equal to the preset variance threshold, or it may be set that step 208 is performed when the variance of the fingerprint image is equal to the preset variance threshold. This is not limited herein.

It may be understood that, because adjustment of the gain of the fingerprint collector affects calculation of the variance of the image. Therefore, it first needs to determine that the average value is in the preset average value range, and then it is determined whether sensitivity needs to be adjusted to make the variance greater than the preset variance threshold. In this way, a determining process can be reduced, and performance of the fingerprint collector can be improved.

Figure 5:
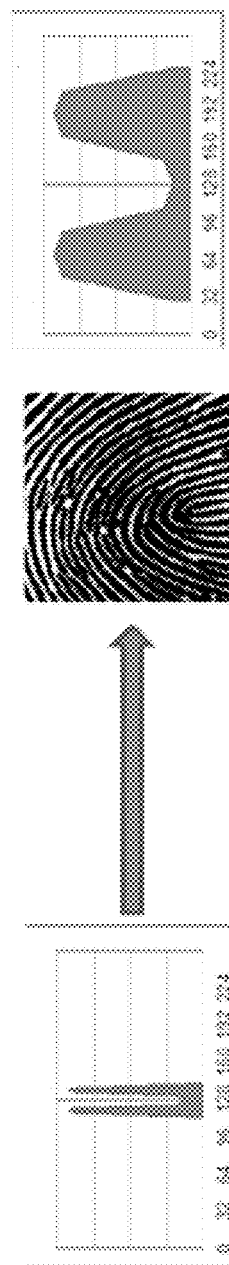
FIG. 5 is a schematic effect diagram that shows impact of a variance value on image contrast according to an embodiment of the present invention.

It should be noted that, a value of the variance of the fingerprint image mainly affects contrast (that is, a distinction between black and white) of the fingerprint image. If the variance of the fingerprint image is excessively small, the fingerprint image has relatively low contrast, and is hard to recognize. As shown in FIG. 5, FIG. 5 is a schematic effect diagram that shows an impact of a variance value on image contrast. The image on the left has a small variance, where black-white contrast is not obvious, and fingerprint identification is relatively difficult. After the variance increases, the image on the right has obvious black-white contrast, and fingerprint identification is relatively easy. Therefore, if it needs to ensure that a collected fingerprint image is recognizable, in addition to ensuring that an average value of the fingerprint image is in the preset average value range, it further needs to ensure that a variance of the fingerprint image is greater than the preset variance threshold. In this way, a collected image has sharp black-white contrast, which facilitates reorganization and fingerprint verification.

207: The fingerprint collector increases sensitivity of the fingerprint collector according to the variance of the fingerprint image, to make a variance of a fingerprint image reacquired by the fingerprint collector increase.

When determining that the variance of the fingerprint image is less than the preset variance threshold, the fingerprint collector increases the sensitivity of the fingerprint collector according to the variance of the fingerprint image, to make the variance of the fingerprint image reacquired by the fingerprint collector increase.

It may be understood that, there are multiple manners for increasing the sensitivity of the fingerprint collector, and two manners are used below as examples.

Optionally, the sensitivity of the fingerprint collector may be directly increased by 1. In this way, if a variance of a next acquired fingerprint image is still less than the preset variance threshold, the sensitivity of the fingerprint collector is increased by 1 again, until a variance of an acquired fingerprint image is greater than the preset variance threshold.

Optionally, if the fingerprint collector stores in advance the second correspondence that represents the correspondence between preset variances and preset sensitivity adjustment values, the fingerprint collector may first search the second correspondence for a sensitivity adjustment value corresponding to the variance of the fingerprint image, and increase the sensitivity of the fingerprint collector according to the found sensitivity adjustment value, to make the variance of the fingerprint image reacquired by the fingerprint collector greater than the preset variance threshold.

208: The fingerprint collector outputs the fingerprint image.

If both determining conditions in step 204 and step 206 are satisfied, that is, it is determined that the average value of the fingerprint image is in the preset average value range and the variance of the fingerprint image is greater than the preset variance threshold, the fingerprint collector outputs the fingerprint image for fingerprint verification.

It may be understood that, when the variance of the fingerprint image is equal to the preset variance threshold, processing is related to a value of the preset variance threshold. In an actual application, according to a different value of the preset variance threshold, it may be set that step 207 is performed when the variance of the fingerprint image is equal to the preset variance threshold, or it may be set that step 208 is performed when the variance of the fingerprint image is equal to the preset variance threshold. This is not limited herein.

In this embodiment of the present invention, before it is determined whether an average value of a fingerprint image is in a preset average value range, it is first determined whether the fingerprint image has a sufficient information volume and whether the fingerprint image can stably represent a real fingerprint status. Only when the average value of the fingerprint image is greater than a preset detection threshold, which represents that the fingerprint image already has a sufficient data volume, and a difference between the average value of the fingerprint image and an average value of a previous fingerprint image is less than a preset difference value, which represents that the fingerprint image can stably represent the real fingerprint status, it is determined that this moment is an optimal image capturing opportunity, and subsequent determining is performed on the acquired fingerprint image. If conditions are satisfied, the fingerprint image is output; or if the conditions are not satisfied, a gain or sensitivity of a fingerprint collector is adaptively adjusted, until a fingerprint image satisfying the conditions is acquired and is then output. On one hand, an optimal image capturing opportunity can be determined by means of real-time tracing, and accuracy of fingerprint image collection by the fingerprint collector is improved, so that the fingerprint collector can obtain an optimal image. On the other hand, a fingerprint image satisfying an image quality requirement is automatically acquired by means of adaptive parameter adjustment, thereby resolving a problem that it is difficult for people with relatively dry or wet fingers to pass verification, improving a fingerprint verification success rate, and enhancing human-machine performance of the fingerprint collector.

For ease of understanding, the fingerprint collection method in this embodiment of the present invention is described in detail below by using a specific application scenario.

If a finger of a user is relatively dry, when the finger of the user is just put on a fingerprint collector, the fingerprint collector acquires a fingerprint image, and obtains through calculation that an average value of the fingerprint image is 25, which is less than the preset detection threshold 40.

A fingerprint image is reacquired, and it is obtained through calculation that an average value of the reacquired fingerprint image is 37, which is less than the preset detecting the preset 40.

A fingerprint image is reacquired, and it is obtained through calculation that an average value of the reacquired fingerprint image is 77, which is greater than the preset detection threshold 40.

The fingerprint collector determines that a difference 40 between the average value 77 and the average value 37 of the fingerprint image acquired at a previous time is not less than a preset difference value 20.

A fingerprint image is reacquired, and it is obtained through calculation that an average value of the reacquired fingerprint image is 85, which is greater than the preset detection threshold 40.

The fingerprint collector determines that a difference 8 between the average value 85 and the average value 77 of the fingerprint image acquired at a previous time is less than the preset difference value 20.

The fingerprint collector determines that the average value 85 of the fingerprint image is not in a preset average value range of 100 to 156.

The fingerprint collector increases a gain by 1 and reacquires a fingerprint image; and it is obtained through calculation that an average value of the reacquired fingerprint image is 110, which is greater than the preset detection threshold 40.

The fingerprint collector determines that a difference 25 between the average value 110 and the average value 85 of the fingerprint image acquired at a previous time is not less than the preset difference value 20.

A fingerprint image is reacquired, and it is obtained through calculation that an average value of the reacquired fingerprint image is 118, which is greater than the preset detection threshold 40.

The fingerprint collector determines that a difference 8 between the average value 118 and the average value 110 of the fingerprint image acquired at a previous time is less than the preset difference value 20.

The fingerprint collector determines that the average value 118 of the fingerprint image is in the preset average value range of 100 to 156.

The fingerprint collector obtains through calculation that a variance of the fingerprint image is 30, and determines that the variance 30 of the fingerprint image is not greater than a preset variance threshold 50.

The fingerprint collector searches a correspondence between variances and sensitivity adjustment values, increases sensitivity by 2 according to a found sensitivity adjustment value, reacquires a fingerprint image, and obtains through calculation that an average value of the re-acquired fingerprint image is 120, which is greater than the preset detection threshold 40.

The fingerprint collector determines that a difference 2 between the average value 120 and the average value 118 of the fingerprint image acquired at a previous time is less than the preset difference value 20.

The fingerprint collector determines that the average value 120 of the fingerprint image is in the preset average value range of 100 to 156.

The fingerprint collector obtains through calculation that a variance of the fingerprint image is 60, and determines that the variance 60 of the fingerprint image is greater than the preset variance threshold 50.

The fingerprint collector outputs the fingerprint image whose average value 120 is in the preset average value range and whose variance 60 is greater than the preset variance threshold, for fingerprint verification.

Figure 6:
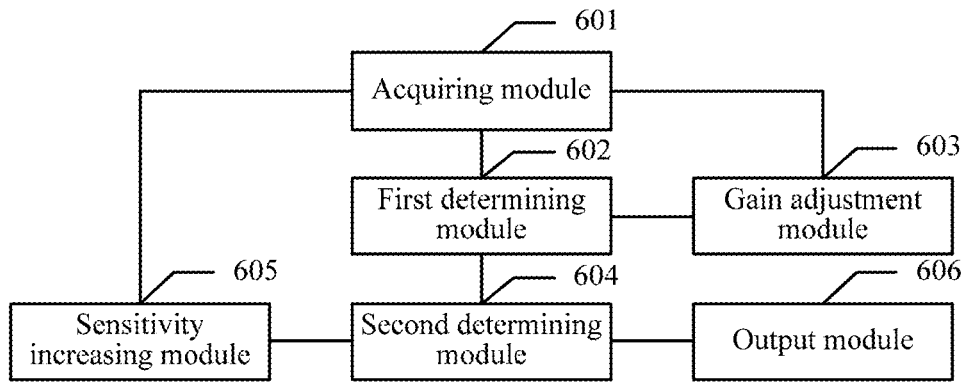
FIG. 6 is a schematic structural diagram of a fingerprint collector according to an embodiment of the present invention.

The following describes the fingerprint collector in this embodiment of the present invention. Referring to FIG. 6, an embodiment of a fingerprint collector according to an embodiment of the present invention includes:

an acquiring module 601, configured to acquire a fingerprint image of a user;

a first determining module 602, configured to determine whether an average value of the fingerprint image acquired by the acquiring module 601 is in a preset average value range, where the average value of the fingerprint image is an average value of pixel values of pixels in the fingerprint image;

a gain adjustment module 603, configured to: when the first determining module 602 determines that the average value of the fingerprint image is not in the preset average value range, adjust a gain of the fingerprint collector according to the average value of the fingerprint image, to make an average value of a fingerprint image reacquired by the acquiring module 601 approximate the preset average value range;

a second determining module 604, configured to: when the first determining module 602 determines that the average value of the fingerprint image is in the preset average value range, determine whether a variance of the fingerprint image is greater than a preset variance threshold, where the variance of the fingerprint image is a variance of the pixel values of the pixels in the fingerprint image;

a sensitivity increasing module 605, configured to: when the second determining module 604 determines that the variance of the fingerprint image is less than the preset variance threshold, increase sensitivity of the fingerprint collector according to the variance of the fingerprint image, to make a variance of a fingerprint image reacquired by the acquiring module 601 increase; and an output module 606, configured to: when the first determining module 602 determines that the average value of the fingerprint image is in the preset average value range and the second determining module 604 determines that the variance of the fingerprint image is greater than the preset variance threshold, output the fingerprint image acquired by the acquiring module 601.

It may be understood that, when the second determining module 604 determines that the variance of the fingerprint image is equal to the preset variance threshold, processing is related to a value of the preset variance threshold. In an actual application, according to a different value of the preset variance threshold, it may be set that the sensitivity increasing module 605 is triggered when the second determining module 604 determines that the variance of the fingerprint image is equal to the preset variance threshold, or it may be set that the output module 606 is triggered when the second determining module 604 determines the variance of the fingerprint image is equal to the preset variance threshold. This is not limited herein.

In this embodiment of the present invention, after the acquiring module 601 acquires a fingerprint image of a user, if the first determining module 602 determines that an average value of the fingerprint image is not in a preset average value range, the gain adjustment module 603 automatically adjusts a gain of the fingerprint collector, to make an average value of a reacquired fingerprint image approximate the preset average value range. If the first determining module 602 determines that the average value of the fingerprint image is in the preset average value range, but the second determining module 604 determines that a variance of the fingerprint image is less than a preset variance threshold, the sensitivity increasing module 605 automatically increases sensitivity of the fingerprint collector, to make a variance of the fingerprint collector accordingly increase. Only a fingerprint image whose average value is in the preset average value range and whose variance is greater than the preset variance threshold is output. In this way, by means of adaptive parameter adjustment, it is ensured that an average value and a variance of a collected fingerprint image each fall within a required quality range, so that the fingerprint sensor can adapt to a degree of dryness or wetness of fingers of all users or of a same user at any moment. Therefore, quality of an image collected by the fingerprint collector is improved, and a verification success rate of the fingerprint sensor is increased.

Figure 7:
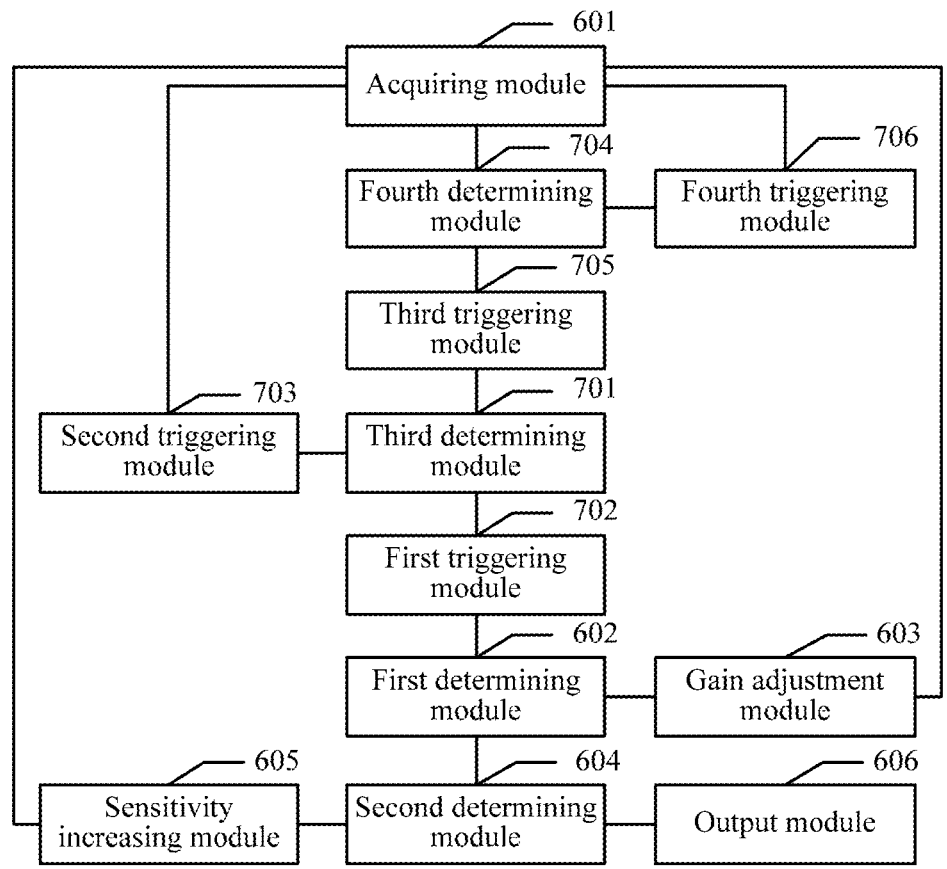
FIG. 7 is another schematic structural diagram of a fingerprint collector according to an embodiment of the present invention.

In the foregoing embodiment, after the acquiring module 601 acquires the fingerprint image, the first determining module 602 first determines whether the average value of the fingerprint image is in the preset average value range. In an actual application, before the first determining module 602 determines whether the average value of the fingerprint image is in the preset average value range, the fingerprint collector may further first determine stability and a data volume of the fingerprint image, and perform subsequent operations after determining that requirements are satisfied. The fingerprint collector in this embodiment of the present invention is described in detail below. Referring to FIG. 7, in another embodiment of a fingerprint collector according to an embodiment of the present invention, the foregoing fingerprint collector further includes:

a third determining module 701, configured to determine whether a difference between the average value of the fingerprint image acquired by the acquiring module 601 and an average value of a fingerprint image acquired at a previous time is less than a preset difference value;

a first triggering module 702, configured to: when the third determining module 701 determines that the difference is less than the preset difference value, trigger the first determining module 602; and a second triggering module 703, configured to: when the third determining module 701 determines that the difference is greater than the preset difference value, trigger the acquiring module 601.

It may be understood that, when the third determining module 701 determines that the difference between the average values is equal to the preset difference value, processing is related to a value of the preset difference value. In an actual application, it may be set that the first triggering module 702 triggers the first determining module 602 when the third determining module 701 determines that the difference between the average values is equal to the preset difference value, or it may be set that the second triggering module 703 triggers the acquiring module 601 when the third determining module 701 determines that the difference between the average values is equal to the preset difference value. This is not limited herein.

Optionally, the fingerprint collector may further include:

a fourth determining module 704, configured to determine whether the average value of the fingerprint image acquired by the acquiring module 601 is greater than a preset detection threshold;

a third triggering module 705, configured to: when the fourth determining module 704 determines that the average value is greater than the preset detection threshold, trigger the third determining module 701; and a fourth triggering module 706, configured to: when the fourth determining module 704 determines that the average value is less than the preset detection threshold, trigger the acquiring module 601.

It may be understood that, when the fourth determining module 704 determines that the average value of the fingerprint image is equal to the preset detection threshold, processing is related to a value of the preset detection threshold. In an actual application, it may be set that the third triggering module 705 triggers the third determining module 701 when the fourth determining module 704 determines that the average value of the fingerprint image is equal to the preset detection threshold, or it may be set that the fourth triggering module 706 triggers the acquiring module 601 when the fourth determining module 704 determines that the average value of the fingerprint image is equal to the preset detection threshold. This is not limited herein.

In this embodiment of the present invention, before the first determining module 602 determines whether an average value of a fingerprint image is in a preset average value range, the third determining module 701 and the fourth determining module 704 first determine whether the fingerprint image has a sufficient information volume and whether the fingerprint image can stably represent a real fingerprint status. Only when the third determining module 701 determines that the average value of the fingerprint image is greater than a preset detection threshold, which represents that the fingerprint image already has a sufficient data volume, and the fourth determining module 704 determines that a difference between the average value of the fingerprint image and an average value of a previous fingerprint image is less than a preset difference value, which represents that the fingerprint image can stably represent the real fingerprint status, it is determined that this moment is an optimal image capturing opportunity, and the first determining module 602 performs subsequent determining on the acquired fingerprint image. If conditions are satisfied, the fingerprint image is output; or if the conditions are not satisfied, a gain or sensitivity of a fingerprint collector is adaptively adjusted, until a fingerprint image satisfying the conditions is acquired and is then output. On one hand, an optimal image capturing opportunity can be determined by means of real-time tracing, and accuracy of collecting a fingerprint image by the fingerprint collector is improved, so that the fingerprint collector can obtain an optimal image. On the other hand, a fingerprint image satisfying an image quality requirement is automatically acquired by means of adaptive parameter adjustment, thereby resolving a problem that it is difficult for people with relatively dry or wet fingers to pass verification, improving a fingerprint verification success rate, and enhancing human-machine performance of the fingerprint collector.

It may be understood that, in an actual application, it may be set that an adjustment value for gain adjustment by the gain adjustment module 603 and an adjustment value for sensitivity adjustment by the sensitivity increasing module 605 are 1 each time; or the fingerprint collector may store a correspondence between preset adjustment values and average values or variances, and determines an adjustment value of each time according to the correspondence. This is not limited herein.

Figure 8:
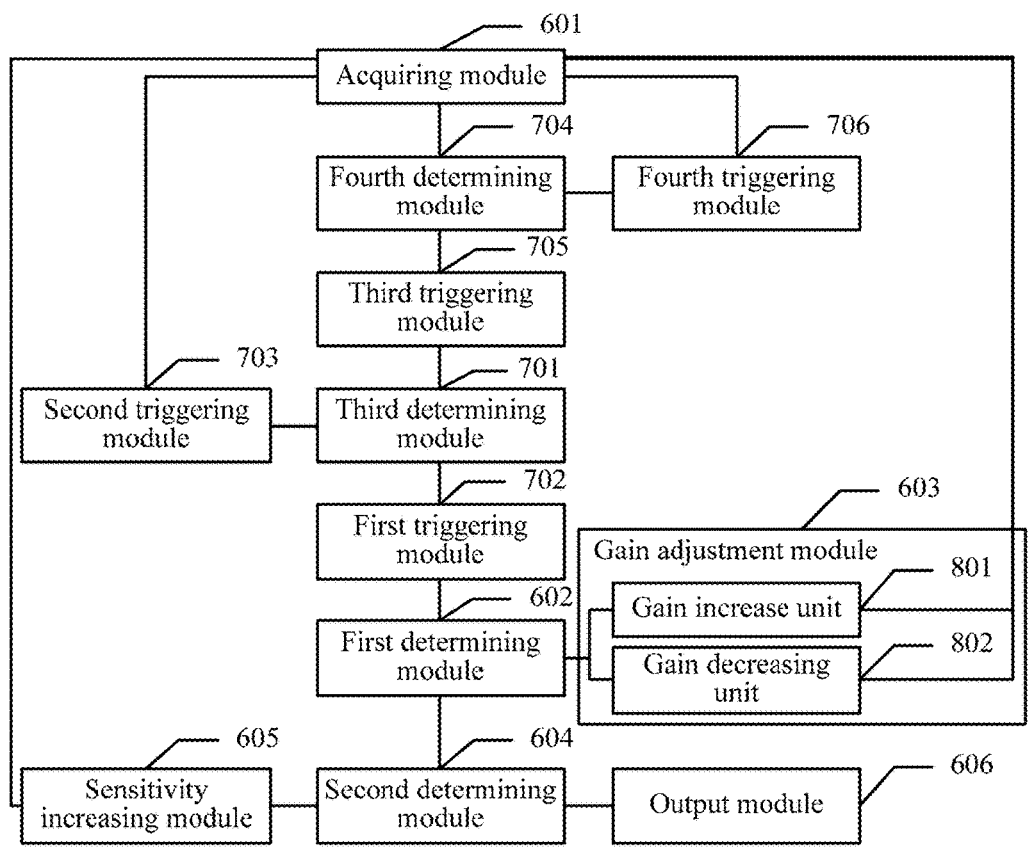
FIG. 8 is another schematic structural diagram of a fingerprint collector according to an embodiment of the present invention.

Optionally, referring to FIG. 8, in another embodiment of a fingerprint collector according to an embodiment of the present invention, in the fingerprint collector shown in FIG. 6 or FIG. 7, the gain adjustment module 603 may specifically include:

a gain increasing unit 801, configured to: when the first determining module 602 determines that the average value of the fingerprint image is less than a minimum value of the preset average value range, increase the gain of the fingerprint collector by 1, where a value of a center point of the preset average value range is 127 or 128; and a gain decreasing unit 802, configured to: when the average value of the fingerprint image is greater than a maximum value of the preset average value range, decrease the gain of the fingerprint collector by 1; and the sensitivity increasing module 605 may be specifically configured to: when the second determining module 604 determines that the variance of the fingerprint image is less than the preset variance threshold, increase the sensitivity of the fingerprint collector by 1.

In this embodiment of the present invention, adjustment values for gain adjustment and sensitivity adjustment by the gain adjustment module 603 and the sensitivity increasing module 605 each time are determined to be a minimum unit of 1, to ensure accuracy of gain adjustment and sensitivity adjustment.

Figure 9:
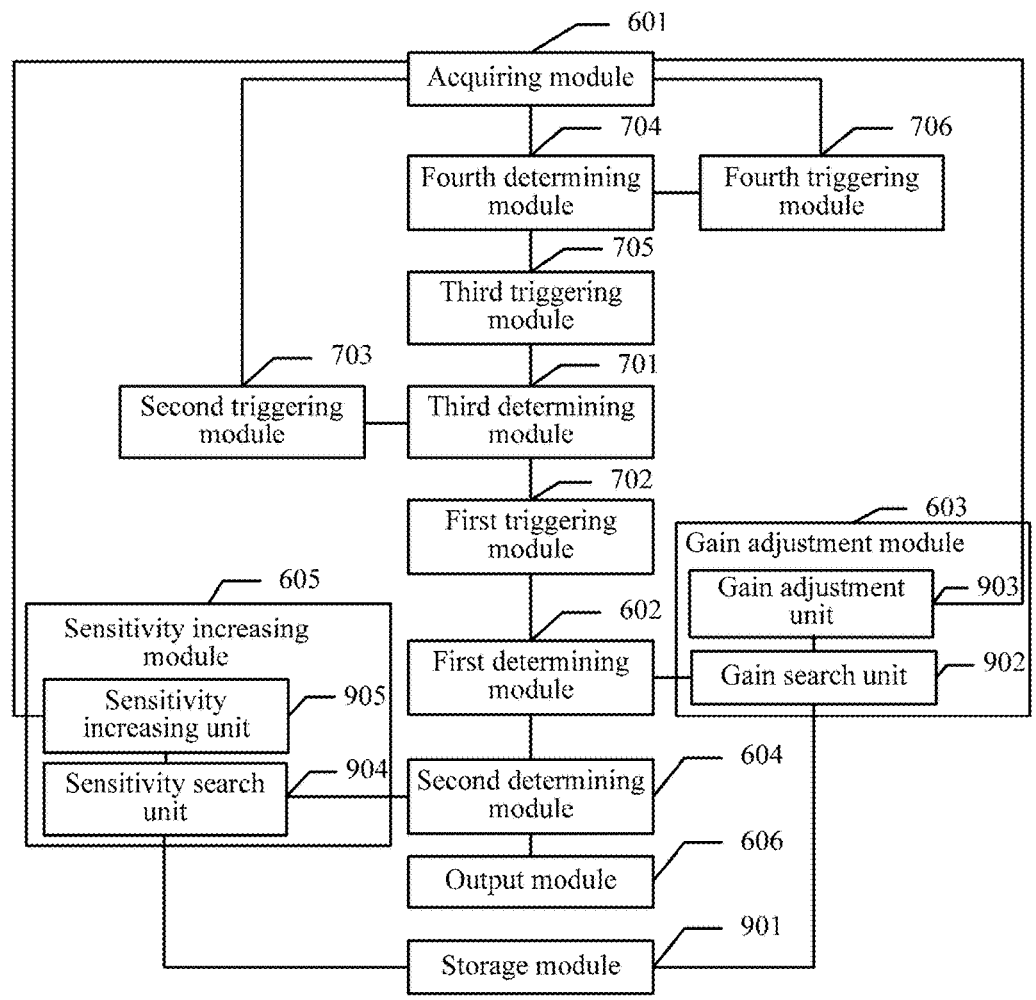
FIG. 9 is another schematic structural diagram of a fingerprint collector according to an embodiment of the present invention.

Optionally, referring to FIG. 9, in another embodiment of a fingerprint collector according to an embodiment of the present invention, the fingerprint collector shown in FIG. 6 or FIG. 7 further includes:

a storage module 901, configured to store a first correspondence and a second correspondence, where the first correspondence represents a correspondence between preset average values and preset gain adjustment values, and the second correspondence represents a correspondence between preset variances and preset sensitivity adjustment values;

the gain adjustment module 603 may specifically include:

a gain search unit 902, configured to search the first correspondence stored by the storage module 901 for a gain adjustment value corresponding to the average value of the fingerprint image; and a gain adjustment unit 903, configured to adjust the gain of the fingerprint collector according to the gain adjustment value found by the gain search unit 902, to make the average value of the fingerprint image reacquired by the acquiring module 601 fall in the preset average value range; and the sensitivity increasing module 605 specifically includes:

a sensitivity search unit 904, configured to search the second correspondence stored by the storage module 901 for a sensitivity adjustment value corresponding to the variance of the fingerprint image; and a sensitivity increasing unit 905, configured to increase the sensitivity of the fingerprint collector according to the sensitivity adjustment value found by the sensitivity search unit 904, to make the variance of the fingerprint image reacquired by the acquiring module 601 greater than the preset variance threshold.

In this embodiment of the present invention, the gain adjustment module 603 and the sensitivity increasing module 605 determine adjustment values of each time according to correspondences stored by the storage module 901. This improves adjustment efficiency, and reduces a time for acquiring a suitable fingerprint image by the fingerprint collector.

For ease of understanding of the foregoing embodiments, the following describes an interaction process of the modules of the foregoing fingerprint collector in a specific application scenario:

If a finger of a user is relatively dry, when the finger of the user is just put on a fingerprint collector, the acquiring module 601 acquires a fingerprint image, and obtains through calculation that an average value of the fingerprint image is 25. The fourth determining module 704 determines that the average value is less than a preset detection threshold 40.

The acquiring module 601 reacquires a fingerprint image, and obtains through calculation that an average value of the reacquired fingerprint image is 37. The fourth determining module 704 determines that the average value is less than the preset detection threshold 40.

The acquiring module 601 reacquires a fingerprint image, and obtains through calculation that an average value of the reacquired fingerprint image is 77. The fourth determining module 704 determines that the average value is greater than the preset detection threshold 40.

The third determining module 701 determines that a difference 40 between the average value 77 and the average value 37 of the fingerprint image acquired at a previous time is not less than a preset difference value 20.

The acquiring module 601 reacquires a fingerprint image, and obtains through calculation that an average value of the reacquired fingerprint image is 85. The fourth determining module 704 determines that the average value is greater than the preset detection threshold 40.

The third determining module 701 determines that a difference 8 between the average value 85 and the average value 77 of the fingerprint image acquired at a previous time is less than the preset difference value 20.

The first determining module 602 determines that the average value 85 of the fingerprint image is not in a preset average value range of 100 to 156.

The gain adjustment module 603 increases a gain by 1. The acquiring module 601 reacquires a fingerprint image, and obtains through calculation that an average value of the re-acquired fingerprint image is 110. The fourth determining module 704 determines that the average value is greater than the preset detection threshold 40.

The third determining module 701 determines that a difference 25 between the average value 110 and the average value 85 of the fingerprint image acquired at a previous time is not less than the preset difference value 20.

The acquiring module 601 reacquires a fingerprint image, and obtains through calculation that an average value of the reacquired fingerprint image is 118. The fourth determining module 704 determines that the average value is greater than the preset detection threshold 40.

The third determining module 701 determines that a difference 8 between the average value 118 and the average value 110 of the fingerprint image acquired at a previous time is less than the preset difference value 20.

The first determining module 602 determines that the average value 118 of the fingerprint image is in the preset average value range of 100 to 156.

The fingerprint collector obtains through calculation that a variance of the fingerprint image is 30, and the second determining module 604 determines that the variance 30 of the fingerprint image is not greater than a preset variance threshold 50.

The sensitivity increasing module 605 searches a correspondence between variances and sensitivity adjustment values, and increases sensitivity by 2 according to a found sensitivity adjustment value. The acquiring module 601 reacquires a fingerprint image, and obtains through calculation that an average value of the reacquired fingerprint image is 120. The fourth determining module 704 determines that the average value is greater than the preset detection threshold 40.

The third determining module 701 determines that a difference 2 between the average value 120 and the average value 118 of the fingerprint image acquired at a previous time is less than the preset difference value 20.

The first determining module 602 determines that the average value 120 of the fingerprint image is in the preset average value range of 100 to 156.

The second determining module 604 obtains through calculation that a variance of the fingerprint image is 60, and determines that the variance 60 of the fingerprint image is greater than the preset variance threshold of 50.

The output module 606 outputs the fingerprint image whose average value 120 is in the preset average value range and whose variance 60 is greater than the preset variance threshold, for fingerprint verification.

It may be understood that, the foregoing fingerprint collector may be a terminal, or may be integrated in some terminals as a functional module or an entity structure. For example, the fingerprint collector may be an attendance machine, or may be a functional module in a mobile phone, a tablet computer, or the like. This is not limited herein.

Figure 10:
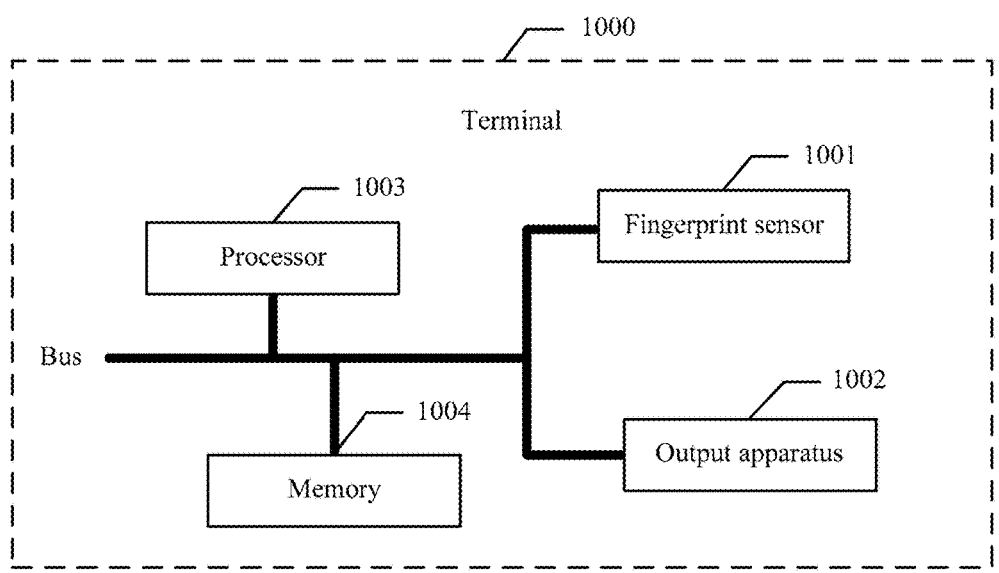
FIG. 10 is a schematic structural diagram of a terminal according to an embodiment of the present invention.

The following describes a terminal in an embodiment of the present invention. Referring to FIG. 10, an embodiment of a terminal 1000 according to an embodiment of the present invention includes:

a fingerprint sensor 1001, an output apparatus 1002, a processor 1003, and a memory 1004 (where there may be one or more processors 1003 in the terminal 1000, and one processor 1003 is used as an example in FIG. 10). In some embodiments of the present invention, the fingerprint sensor 1001, the output apparatus 1002, the processor 1003, and the memory 1004 may be connected by using a bus or in another manner, where a bus connection is used as an example in FIG. 10.

The fingerprint sensor 1001 is configured to acquire a fingerprint image of a user; and the processor 1003 is configured to perform the following steps by invoking an operation instruction stored in the memory 1004:

determining whether an average value of the fingerprint image acquired by the fingerprint sensor 1001 is in a preset average value range, where the average value of the fingerprint image is an average value of pixel values of pixels in the fingerprint image;

when determining that the average value of the fingerprint image is not in the preset average value range, adjusting a gain of the fingerprint sensor 1001 according to the average value of the fingerprint image, to make an average value of a fingerprint image reacquired by the fingerprint sensor 1001 approximate the preset average value range;

when determining that the average value of the fingerprint image is in the preset average value range, determining whether a variance of the fingerprint image is greater than a preset variance threshold, where the variance of the fingerprint image is a variance of the pixel values of the pixels in the fingerprint image;

when determining that the variance of the fingerprint image is less than the preset variance threshold, increasing sensitivity of the fingerprint sensor according to the variance of the fingerprint image, to make a variance of a fingerprint image reacquired by the fingerprint sensor 1001 increase; and when determining that the average value of the fingerprint image is in the preset average value range and the variance of the fingerprint image is greater than the preset variance threshold, instructing the output apparatus 1002 to output the fingerprint image.

It may be understood that, when the variance of the fingerprint image is equal to the preset variance threshold, processing is related to a value of the preset variance threshold. In an actual application, according to a different value of the preset variance threshold, it may be set that the step of increasing sensitivity of the fingerprint sensor is performed when the variance of the fingerprint image is equal to the preset variance threshold, or it may be set that the step of instructing the output apparatus 1002 to output the fingerprint image is performed when the variance of the fingerprint image is equal to the preset variance threshold. This is not limited herein.

In some embodiments of the present invention, before performing the step of determining whether an average value of the fingerprint image acquired by the fingerprint sensor 1001 is in a preset average value range, the processor 1003 is further configured to perform the following steps:

determining whether a difference between the average value of the fingerprint image and an average value of a fingerprint image acquired at a previous time is less than a preset difference value;

when determining that the difference is less than the preset difference value, performing the step of determining whether an average value of the fingerprint image acquired by the fingerprint sensor 1001 is in a preset average value range; and when determining that the difference is greater than the preset difference value, instructing the fingerprint sensor 1001 to reacquire a fingerprint image of the user.

It may be understood that, when the difference between the average values is equal to the preset difference value, processing is related to a value of the preset difference value. In an actual application, it may be set that the step of determining whether an average value of the fingerprint image acquired by the fingerprint sensor 1001 is in a preset average value range is performed when the difference between the average values is equal to the preset difference value, or it may be set that the step of instructing the fingerprint sensor 1001 to reacquire a fingerprint image of the user is performed when the difference between the average values is equal to the preset difference value. This is not limited herein.

In some embodiments of the present invention, before performing the step of determining whether a difference between the average value of the fingerprint image and an average value of a fingerprint image acquired at a previous time is less than a preset difference value, the processor 1003 is further configured to perform the following steps:

determining whether the average value of the fingerprint image is greater than a preset detection threshold;

when determining that the average value is greater than the preset detection threshold, performing the step of determining whether a difference between the average value of the fingerprint image and an average value of a fingerprint image acquired at a previous time is less than a preset difference value; and when determining that the average value is less than the preset detection threshold, instructing the fingerprint sensor 1001 to reacquire a fingerprint image of the user.

It may be understood that, when the average value of the fingerprint image is equal to the preset detection threshold, processing is related to a value of the preset detection threshold. In an actual application, it may be set that the step of determining whether a difference between the average value of the fingerprint image and an average value of a fingerprint image acquired at a previous time is less than a preset difference value is performed when the average value of the fingerprint image is equal to the preset detection threshold, or it may be set that the step of instructing the fingerprint sensor 1001 to reacquire a fingerprint image of the user is performed when the average value of the fingerprint image is equal to the preset detection threshold. This is not limited herein.

In some embodiments of the present invention, when performing the step of adjusting a gain of the fingerprint sensor 1001 according to the average value of the fingerprint image, the processor 1003 specifically performs the following steps:

when the average value of the fingerprint image is less than a minimum value of the preset average value range, increasing the gain of the fingerprint sensor by 1, where a value of a center point of the preset average value range is 127 or 128; and when the average value of the fingerprint image is greater than a maximum value of the preset average value range, decreasing the gain of the fingerprint sensor 1001 by 1; and when performing the step of increasing sensitivity of the fingerprint sensor according to the variance of the fingerprint image, the processor 1003 specifically performs the following step:

increasing the sensitivity of the fingerprint sensor 1001 by 1.

In some embodiments of the present invention, the memory 1004 is further configured to store a first correspondence and a second correspondence, where the first correspondence represents a correspondence between preset average values and preset gain adjustment values, and the second correspondence represents a correspondence between preset variances and preset sensitivity adjustment values;

when performing the step of adjusting a gain of the fingerprint sensor 1001 according to the average value of the fingerprint image, the processor 1003 specifically performs the following steps:

searching the first correspondence for a gain adjustment value corresponding to the average value of the fingerprint image; and adjusting the gain of the fingerprint sensor 1001 according to the found gain adjustment value, to make the average value of the fingerprint image reacquired by the fingerprint sensor 1001 fall in the preset average value range; and when performing the step of increasing sensitivity of the fingerprint sensor 1001 according to the variance of the fingerprint image, the processor 1003 specifically performs the following steps:

searching the second correspondence for a sensitivity adjustment value corresponding to the variance of the fingerprint image; and increasing the sensitivity of the fingerprint sensor 1001 according to the found sensitivity adjustment value, to make the variance of the fingerprint image reacquired by the fingerprint sensor 1001 greater than the preset variance threshold.

An embodiment of the present invention further includes a computer readable storage medium that stores one or more programs, where the one or more programs include instructions, and when the instructions are executed by a portable electronic device including multiple application programs, the portable electronic device executes the fingerprint collection method corresponding to FIG. 1 or shown in any embodiment corresponding a figure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A fingerprint collection method, comprising:
    acquiring, by a fingerprint collection equipment, a fingerprint image of a user;
    determining, by the fingerprint collection equipment, whether an average value of the fingerprint image is in a preset average value range, wherein the average value of the fingerprint image is an average value of pixel values of pixels in the fingerprint image;
    when determining that the average value of the fingerprint image is not in the preset average value range, adjusting, by the fingerprint collection equipment, gain control of the fingerprint collection equipment according to the average value of the fingerprint image, to make an average value of a fingerprint image reacquired by the fingerprint collection equipment approximate the preset average value range;
    when determining that the average value of the fingerprint image is in the preset average value range, determining, by the fingerprint collection equipment, whether a variance of the fingerprint image is greater than a preset variance threshold, wherein the variance of the fingerprint image is a variance of the pixel values of the pixels in the fingerprint image;
    when determining that the variance of the fingerprint image is less than the preset variance threshold, increasing, by the fingerprint collection equipment, sensitivity of the fingerprint collection equipment according to the variance of the fingerprint image, to make a variance of a fingerprint image reacquired by the fingerprint collection equipment increase; and
    when determining that the average value of the fingerprint image is in the preset average value range and the variance of the fingerprint image is greater than the preset variance threshold, outputting, by the fingerprint collection equipment, the fingerprint image.

2. The method according to claim 1, before the determining, by the fingerprint collection equipment, whether an average value of the fingerprint image is in a preset average value range, further comprising:
    determining, by the fingerprint collection equipment, whether a difference between the average value of the fingerprint image and an average value of a fingerprint image acquired at a previous time is less than a preset difference value;

when determining that the difference is less than the preset difference value, triggering the determining, by the fingerprint collection equipment, whether an average value of the fingerprint image is in a preset average value range; and when determining that the difference is greater than the preset difference value, triggering the acquiring, by a fingerprint collection equipment, a fingerprint image of a user.

3. The method according to claim 2, before the determining, by the fingerprint collection equipment, whether a difference between the average value of the fingerprint image and an average value of a fingerprint image acquired at a previous time is less than a preset difference value, further comprising:

determining, by the fingerprint collection equipment, whether the average value of the fingerprint image is greater than a preset detection threshold;

when determining that the average value is greater than the preset detection threshold, triggering the determining, by the fingerprint collection equipment, whether a difference between the average value of the fingerprint image and an average value of a fingerprint image acquired at a previous time is less than a preset difference value; and when determining that the average value is less than the preset detection threshold, triggering the acquiring, by a fingerprint collection equipment, a fingerprint image of a user.

4. The method according to claim 1, wherein the adjusting, by the fingerprint collection equipment, the gain control of the fingerprint collection equipment according to the average value of the fingerprint image specifically comprises:

when the average value of the fingerprint image is less than a minimum value of the preset average value range, increasing the gain control of the fingerprint collection equipment by 1, wherein a value of a center point of the preset average value range is 127 or 128; and when the average value of the fingerprint image is greater than a maximum value of the preset average value range, decreasing the gain control of the fingerprint collection equipment by 1; and the increasing, by the fingerprint collection equipment, sensitivity of the fingerprint collection equipment according to the variance of the fingerprint image specifically comprises:

increasing the sensitivity of the fingerprint collection equipment by 1.

5. The method according to claim 1, wherein the method further comprises:

storing, by the fingerprint collection equipment, a first correspondence and a second correspondence, wherein the first correspondence represents a correspondence between preset average values and preset gain adjustment values, and the second correspondence represents a correspondence between preset variances and preset sensitivity adjustment values;

the adjusting, by the fingerprint collection equipment, the gain control of the fingerprint collection equipment according to the average value of the fingerprint image comprises:

searching, by the fingerprint collection equipment, the first correspondence for a gain adjustment value corresponding to the average value of the fingerprint image; and adjusting, by the fingerprint collection equipment, the gain control of the fingerprint collection equipment according to the found gain adjustment value, to make the average value of the fingerprint image reacquired by the fingerprint collection equipment fall in the preset average value range; and the increasing, by the fingerprint collection equipment, sensitivity of the fingerprint collection equipment according to the variance of the fingerprint image comprises:

searching, by the fingerprint collection equipment, the second correspondence for a sensitivity adjustment value corresponding to the variance of the fingerprint image; and increasing, by the fingerprint collection equipment, the sensitivity of the fingerprint collection equipment according to the found sensitivity adjustment value, to make the variance of the fingerprint image reacquired by the fingerprint collection equipment greater than the preset variance threshold.

6. A non-transitory computer-readable medium comprising processor-executable instructions stored thereon which when executed by a processor cause the processor to implement operations including:

acquiring a fingerprint image of a user;

determining whether an average value of the fingerprint image acquired by the acquiring module is in a preset average value range, wherein the average value of the fingerprint image is an average value of pixel values of pixels in the fingerprint image;

when it is determined that the average value of the fingerprint image is not in the preset average value range, adjusting gain control of a fingerprint collector according to the average value of the fingerprint image, to make an average value of a fingerprint image approximate the preset average value range;

when it is determined that the average value of the fingerprint image is in the preset average value range, determining whether a variance of the fingerprint image is greater than a preset variance threshold, wherein the variance of the fingerprint image is a variance of the pixel values of the pixels in the fingerprint image;

when it is determined that the variance of the fingerprint image is less than the preset variance threshold, increasing sensitivity of the fingerprint collector according to the variance of the fingerprint image, to make a variance of a fingerprint image increase; and when it is determined that the average value of the fingerprint image is in the preset average value range and it is determined that the variance of the fingerprint image is greater than the preset variance threshold, outputting the fingerprint image.

7. The non-transitory computer-readable medium according to claim 6, wherein the operations further comprise:

determining whether a difference between the average value of the fingerprint image and an average value of a fingerprint image acquired at a previous time is less than a preset difference value;

when it is determined that the difference is less than the preset difference value, triggering the operation of determining whether the average value of the fingerprint image is in the preset average value range; and when it is determined that the difference is greater than the preset difference value, triggering the operation of acquiring the fingerprint image of the user.

8. The fingerprint collector according to claim 7, wherein the operations further comprise:

determining whether the average value of the fingerprint image is greater than a preset detection threshold;

when it is determined that the average value is greater than the preset detection threshold, triggering the operation of determining whether the difference between the average value of the fingerprint image and the average value of the fingerprint image acquired at the previous time is less than the preset difference value; and when it is determined that the average value is less than the preset detection threshold, triggering the operation of acquiring the fingerprint image of the user.

9. The non-transitory computer-readable medium according to claim 6, wherein the operation of adjusting the gain control of the fingerprint collector further comprises:

when it is determined that the average value of the fingerprint image is less than a minimum value of the preset average value range, increasing the gain control of the fingerprint collector by 1, wherein a value of a center point of the preset average value range is 127 or 128; and when the average value of the fingerprint image is greater than a maximum value of the preset average value range, decreasing the gain control of the fingerprint collector by 1; and wherein the operation of increasing the sensitivity of the fingerprint collector further comprises: when it is determined that the variance of the fingerprint image is less than the preset variance threshold, increasing the sensitivity of the fingerprint collector by 1.

10. The non-transitory computer-readable medium according to claim 6, wherein the operations further comprise:

storing a first correspondence and a second correspondence, wherein the first correspondence represents a correspondence between preset average values and preset gain adjustment values, and the second correspondence represents a correspondence between preset variances and preset sensitivity adjustment values;

wherein the operation of adjusting the gain control of the fingerprint collector further comprises:

searching the first correspondence stored by the storage module for a gain adjustment value corresponding to the average value of the fingerprint image; and adjusting the gain control of the fingerprint collector according to the gain adjustment value, to make the average value of the fingerprint image fall in the preset average value range; and wherein the operation of increasing the sensitivity of the fingerprint collector further comprises:

searching the second correspondence for a sensitivity adjustment value corresponding to the variance of the fingerprint image; and increasing the sensitivity of the fingerprint collector according to the sensitivity adjustment value, to make the variance of the fingerprint image greater than the preset variance threshold.

11. A fingerprint collector, comprising:

a fingerprint sensor, an output apparatus, a memory, and a processor, wherein the fingerprint sensor is configured to acquire a fingerprint image of a user; and the processor is configured to perform the following by invoking an operation instruction stored in the memory:

determining whether an average value of the fingerprint image acquired by the fingerprint sensor is in a preset average value range, wherein the average value of the fingerprint image is an average value of pixel values of pixels in the fingerprint image;

when determining that the average value of the fingerprint image is not in the preset average value range, adjusting gain control of the fingerprint sensor according to the average value of the fingerprint image, to make an average value of a fingerprint image reacquired by the fingerprint sensor approximate the preset average value range;

when determining that the average value of the fingerprint image is in the preset average value range, determining whether a variance of the fingerprint image is greater than a preset variance threshold, wherein the variance of the fingerprint image is a variance of the pixel values of the pixels in the fingerprint image;

when determining that the variance of the fingerprint image is less than the preset variance threshold, increasing sensitivity of the fingerprint sensor according to the variance of the fingerprint image, to make a variance of a fingerprint image reacquired by the fingerprint sensor increase; and when determining that the average value of the fingerprint image is in the preset average value range and the variance of the fingerprint image is greater than the preset variance threshold, instructing the output apparatus to output the fingerprint image.

12. The fingerprint collector according to claim 11, wherein before performing the determining whether an average value of the fingerprint image acquired by the fingerprint sensor is in a preset average value range, the processor is further configured to perform the following:

determining whether a difference between the average value of the fingerprint image and an average value of a fingerprint image acquired at a previous time is less than a preset difference value;

when determining that the difference is less than the preset difference value, performing the determining whether an average value of the fingerprint image acquired by the fingerprint sensor is in a preset average value range; and when determining that the difference is greater than the preset difference value, instructing the fingerprint sensor to reacquire a fingerprint image of the user.

13. The fingerprint collector according to claim 12, wherein before performing the determining whether a difference between the average value of the fingerprint image and an average value of a fingerprint image acquired at a previous time is less than a preset difference value, the processor is further configured to perform the following:

determining whether the average value of the fingerprint image is greater than a preset detection threshold;

when determining that the average value is greater than the preset detection threshold, performing the determining whether a difference between the average value of the fingerprint image and an average value of a fingerprint image acquired at a previous time is less than a preset difference value; and when determining that the average value is less than the preset detection threshold, instructing the fingerprint sensor to reacquire a fingerprint image of the user.

14. The fingerprint collector according to claim 11 wherein when performing the adjusting the gain control of the fingerprint sensor according to the average value of the fingerprint image, the processor performs the following:

when the average value of the fingerprint image is less than a minimum value of the preset average value range, increasing the gain control of the fingerprint sensor by 1, wherein a value of a center point of the preset average value range is 127 or 128; and when the average value of the fingerprint image is greater than a maximum value of the preset average value range, decreasing the gain control of the fingerprint sensor by 1; and when performing the increasing sensitivity of the fingerprint sensor according to the variance of the fingerprint image, the processor specifically performs the following:

increasing the sensitivity of the fingerprint sensor by 1.

15. The fingerprint collector according to claim 11, wherein the memory is further configured to store a first correspondence and a second correspondence, wherein the first correspondence represents a correspondence between preset average values and preset gain adjustment values, and the second correspondence represents a correspondence between preset variances and preset sensitivity adjustment values;

when performing the adjusting the gain control of the fingerprint sensor according to the average value of the fingerprint image, the processor performs the following:

searching the first correspondence for a gain adjustment value corresponding to the average value of the fingerprint image; and adjusting the gain control of the fingerprint sensor according to the found gain adjustment value, to make the average value of the fingerprint image reacquired by the fingerprint sensor fall in the preset average value range; and when performing the increasing sensitivity of the fingerprint sensor according to the variance of the fingerprint image, the processor specifically performs the following:

searching the second correspondence for a sensitivity adjustment value corresponding to the variance of the fingerprint image; and increasing the sensitivity of the fingerprint sensor according to the found sensitivity adjustment value, to make the variance of the fingerprint image reacquired by the fingerprint sensor greater than the preset variance threshold.

* * * * *